(12) United States Patent
Toya

(10) Patent No.: US 9,762,330 B2
(45) Date of Patent: Sep. 12, 2017

(54) OPTICAL COMMUNICATION DEVICE AND METHOD OF CONTROLLING OPTICAL MODULATOR

(71) Applicant: Fujitsu Optical Components Limited, Kawasaki-shi, Kanagawa (JP)

(72) Inventor: Akihiro Toya, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 67 days.

(21) Appl. No.: 14/810,541

(22) Filed: Jul. 28, 2015

(65) Prior Publication Data

US 2016/0056896 A1 Feb. 25, 2016

(30) Foreign Application Priority Data

Aug. 22, 2014 (JP) ................. 2014-169157

(51) Int. Cl.
| | | |
|---|---|---|
| H04B 10/25 | (2013.01) | |
| H04B 10/50 | (2013.01) | |
| H04B 10/588 | (2013.01) | |

(52) U.S. Cl.
CPC ... *H04B 10/5053* (2013.01); *H04B 10/50575* (2013.01); *H04B 10/588* (2013.01)

(58) Field of Classification Search
CPC ............ H04B 10/50575; H04B 10/505; H04B 10/50572; H04B 10/50595; G02F 1/0123; G02F 2001/212; G02F 1/2255; G02F 1/2257
USPC ....................................................... 398/183
See application file for complete search history.

(56) References Cited

U.S. PATENT DOCUMENTS

| | | | | |
|---|---|---|---|---|
| 2001/0007508 A1* | 7/2001 | Ooi | ................. | G02F 1/0123 359/245 |
| 2005/0254743 A1 | 11/2005 | Akiyama et al. | | |
| 2012/0308240 A1* | 12/2012 | Akiyama | ......... | H04B 10/50575 398/141 |
| 2013/0051723 A1* | 2/2013 | Sudo | .................. | G02F 1/0123 385/3 |
| 2013/0135704 A1* | 5/2013 | Fujisaku | .......... | H04B 10/50575 359/279 |
| 2014/0168741 A1* | 6/2014 | Li | .................... | G02F 1/0123 359/239 |

FOREIGN PATENT DOCUMENTS

| | | |
|---|---|---|
| JP | 2005-326548 | 11/2005 |
| JP | 2012-257164 | 12/2012 |

OTHER PUBLICATIONS

Patent Abstracts of Japan, Publication No. 2012-257164, published Dec. 27, 2012.
Patent Abstracts of Japan, Publication No. 2005-326548, published Nov. 24, 2005.

* cited by examiner

*Primary Examiner* — Don N Vo
(74) *Attorney, Agent, or Firm* — Staas & Halsey LLP

(57) ABSTRACT

An optical communication device includes an optical modulator of a Mach-Zehnder type, a low frequency superimposing circuit configured to superimpose a low frequency signal on a substrate bias voltage applied to the optical modulator, a monitor configured to monitor a modulated light output from the optical modulator, and a substrate bias controller configured to control the substrate bias voltage based upon a low frequency component contained in a monitor signal output from the monitor.

7 Claims, 7 Drawing Sheets

OPTICAL COMMUNICATION DEVICE AND METHOD OF CONTROLLING OPTICAL MODULATOR

CROSS-REFERENCE TO RELATED APPLICATIONS

This application is based upon and claims the benefit of priority of the prior Japanese Patent Application No. 2014-169157 filed on Aug. 22, 2014, which is incorporated herein by references in its entirety.

FIELD

The disclosures herein relate to bias control for an optical modulator used in a fiber optic communication system.

BACKGROUND

In recent years, 100 Gigabit-per-second (Gbs) long-distance optical transmission has been implemented by dual-polarization quadrature phase-shift keying (DP-QPSK) using a digital coherent technology. To further improve transmission capacity, greater-level modulation schemes such as polarization division multiplexed 16 quadrature amplitude modulation (16-QAM) are being developed. Nyquist wavelength division multiplexing (WDM) is also being developed to increase the transmission rate.

For optical modulation, Mach-Zehnder optical modulators are generally used, in which modulators a Mach-Zehnder interferometer is formed by a pair of optical waveguide to modulate the optical phase of a light beam. Mach-Zehnder optical modulators have less wavelength (or frequency) chirping compared with a phase modulation scheme using a single waveguide, and are suitable to long-distance optical transmission.

Typically, Lithium niobate ($LiNbO_3$) Mach-Zehnder interferometers making use of the electro-optic effect (Pockels effect) of a dielectric material are used. To reduce a device size, multilevel modulation schemes using a semiconductor Mach-Zehnder interferometer are being developed.

There is an intrinsic problem in semiconductor optical modulators that the modulation characteristic (i.e., the relationship between applied voltage and optical phase change) varies depending on the wavelength of a light beam input to the modulator. In semiconductor optical modulators, the absorption edge wavelength of the semiconductor material changes according to applied voltage, and the phase of light is modulated making use of the phase shift due to absorption based on Kramers-Kronig relations. Hence, semiconductor optical modulators have wavelength dependency such that the closer to the absorption-edge-wavelength the light to be modulated is, the greater the phase change with respect to the voltage change.

To address the wavelength dependency of the modulation characteristic of semiconductor optical modulators, several techniques for controlling a substrate bias voltage or amplitude of a drive signal according to the wavelength of input light are proposed. The first technique is to set the substrate bias voltage to a predetermined level according to the wavelength, and drive the modulator at a constant amplitude of a drive signal regardless of the wavelength. See, for example, Japanese Laid-open Patent Publication No. 2005-326548 A.

The second technique is to perform feedback control on the substrate bias voltage or drive signal amplitude. A low frequency signal is superimposed on driving data signals, and output light signals are monitored. Responsive to the monitoring result, the substrate bias voltage and/or the amplitude of the modulator drive signal is controlled. See, for example, Japanese Laid-open patent publication No. 2012-257164 A.

With the first technique described above, the substrate bias voltage is set to a fixed level according to the wavelength. Accordingly, the modulation characteristic is likely to deviate from the optimum condition. Such deviation occurs when the amplitude of a drive signal output from a driving circuit is influenced by a temperature change or other changes, or when a modulation characteristic itself changes with time. Besides, this method needs to obtain data of the wavelength-to-modulation characteristic of the optical modulator in advance, which takes extra time for testing and is costly.

The second technique uses a driving circuit to control the optical modulator. In order to incorporate the control mechanism for the optical modulator into a product, the driving circuit needs to be built in together with the optical modulator. There are variety of product forms including a module with only a semiconductor optical modulator, or a module in which a semiconductor optical modulator and a semiconductor laser are mounted together. A driving mechanism for an optical modulator uses many driving circuits depending on the modulation scheme (or the modulation rate). For the configuration of controlling the characteristics of an optical modulator using multiple driving circuits, it is difficult to maintain the module size small.

It is desired for fiber optic communication systems to control the modulation characteristics of an optical modulator to be in the optimal conditions, while maintaining the device size small.

SUMMARY

According to an aspect of the disclosures, an optical communication device has
  an optical modulator of a Mach-Zehnder type;
  a low frequency superimposing circuit configured to superimpose a low frequency signal on a substrate bias voltage applied to the optical modulator;
  a monitor configured to monitor a modulated light output from the optical modulator; and
  a substrate bias controller configured to control the substrate bias voltage based upon a low frequency component contained in a monitor signal output from the monitor.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

First Embodiment

Figure 1:
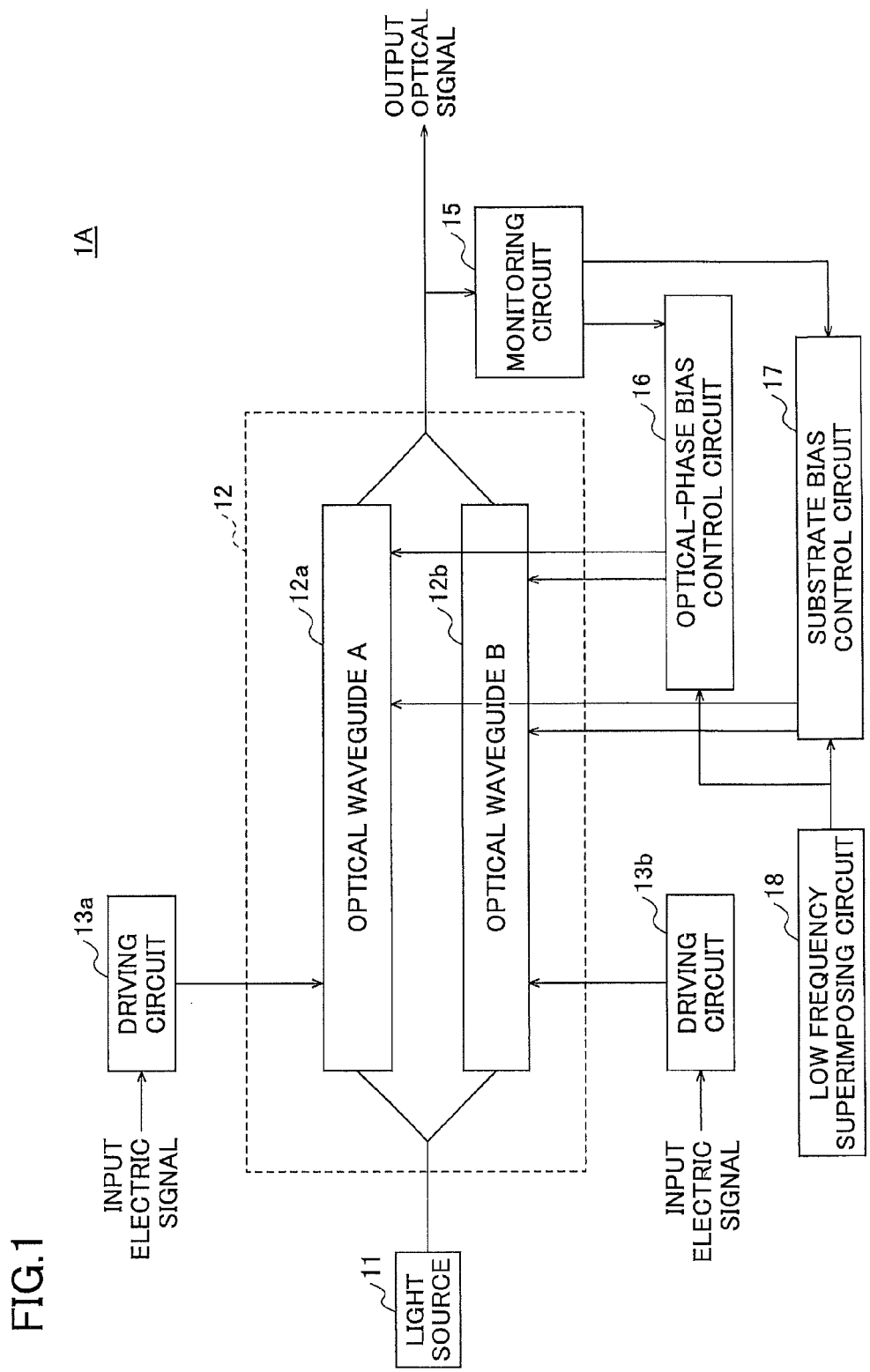
FIG. 1 is a schematic diagram of an optical transmitter according to the first embodiment of the invention.

FIG. 1 is a schematic diagram of an optical transmitter 1A, which is an example of an optical communication device, according to the first embodiment. The optical transmitter 1A has a light source 11, a Mach-Zehnder optical modulator 12 (hereinafter, which may be referred to simply as "optical modulator 12"), and driving circuits 13a and 13b for driving the optical modulator 12. The optical transmitter 1A also has a monitoring circuit 15 for monitoring an output of the optical modulator 12, an optical-phase bias control circuit 16 to control a phase bias voltage based upon the monitoring result, a substrate bias control circuit 17 to control a substrate bias voltage based upon the monitoring result, and a low frequency superimposing circuit 18 to supply a low frequency signal to the substrate bias control circuit 17.

The light source 11 is, for example, a wavelength-tunable semiconductor laser suitable for use in WDM transmission systems. The optical modulator 12 has a pair of waveguides 12a and 12b (which waveguides are labeled as "optical waveguide A" and "optical waveguide B" in FIG. 1). The amount of phase change of light beams in the waveguides 12a and 12b varies depending on the substrate bias voltage. The optical-phase bias control circuit 16 controls a phase bias voltage for adjusting a phase difference of light beams between the two waveguides 12a and 12b. The substrate bias control circuit 17 controls a substrate bias voltage that determines the operating point (or the center of the amplitude of a modulator drive signal) of the optical modulator 12.

The light emitted from the light source 11 is guided to the optical modulator 12, and branched into the waveguides 12a and 12b. The driving circuits 13a and 13b amplify input electric signals to drive the optical modulator 12. High-frequency (e.g., 32 Gbps) drive signals supplied from the driving circuits 13a and 13b are input to signal electrodes (not illustrated) of the waveguides 12a and 12b, respectively, to modulate the light beams traveling through the waveguides 12a and 12b. The light beams having undergone the phase modulation at the waveguides 12a and 12b are combined and the combined light is output from the optical modulator 12. A portion of the output light of the optical modulator 12 is detected at the monitoring circuit 15 and converted to an electric signal. The electric signal is supplied as a monitor signal to the substrate bias control circuit 17 and the optical-phase bias control circuit 16.

The low frequency superimposing circuit 18 repeatedly generates a signal whose frequency is sufficiently low (for example, several kilohertz) compared with the drive signal frequency, and supplies the generated low frequency signal to the substrate bias control circuit 17 and the optical-phase bias control circuit 16. The substrate bias control circuit 17 slightly modulates (at a small modulation depth) the substrate bias voltage applied to the optical modulator 12 with the low frequency signal. The substrate bias control circuit 17 detects a low frequency component contained in the monitor signal supplied from the monitoring circuit 15 and controls the substrate bias voltage such that the magnitude of the detected low frequency component approaches zero. The substrate bias control circuit 17 has a phase comparator (not illustrated) that compares the phase of the low frequency component contained in the monitor signal with the phase of the low frequency signal supplied from the low frequency superimposing circuit 18. Based upon the comparison result, the direction of control on the substrate bias voltage (to increase or decrease) is determined.

The optical-phase bias control circuit 16 slightly modulates the phase bias voltage with the low frequency signal, and controls the phase bias voltage such that the low frequency component contained in the monitor signal approaches zero. In an optical phase modulation scheme, the phase bias voltage is controlled such that the center of the amplitude of the drive signal approaches a point at which the light intensity of the voltage-to-light intensity characteristic (i.e., the modulation curve) becomes the minimum. By controlling the phase bias voltage so as to minimize the monitored low frequency component, the amplitude center of the drive signal can be brought to be consistent with the minimum point of the modulation curve.

Figure 2:
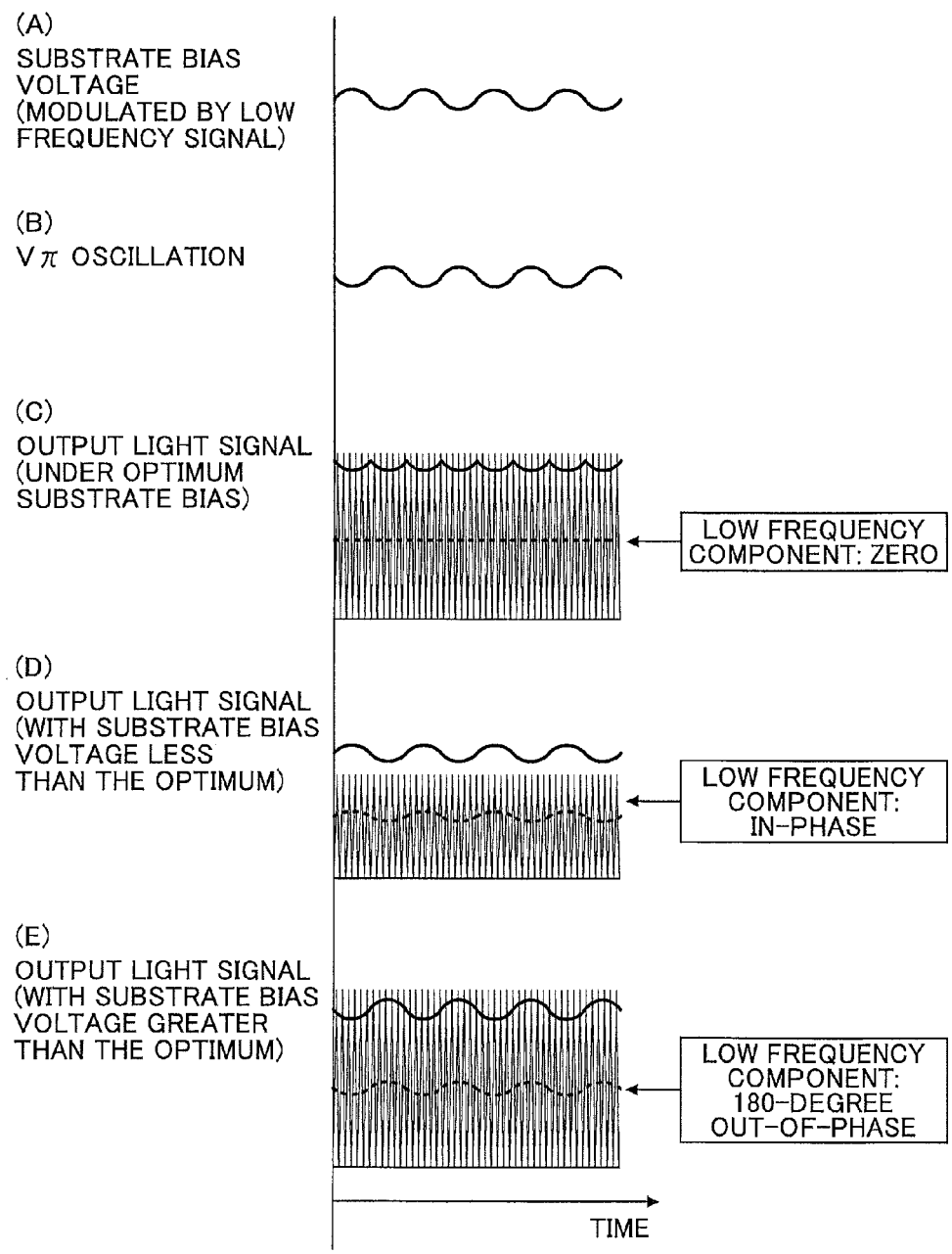
FIG. 2 illustrates a basic idea of controlling a substrate bias voltage while superimposing a low frequency signal.

FIG. 2 illustrates how the substrate bias voltage is controlled under the superimposition of the low frequency signal. As has been explained above, the modulation characteristic (i.e., the amount of phase change with respect to applied voltage) of a semiconductor optical modulator can be controlled by changing a substrate bias voltage. In binary or quadrature phase shift keying, binary phase modulation is performed between 0 radians and $\pi$ radians using a single Mach-Zehnder interferometer of the optical modulator 12. When a substrate bias voltage for the optical modulator 12 is modulated by a low frequency signal as illustrate in part (A) of FIG. 2, the voltage-to-phase characteristic (V$\pi$) fluctuates according to the low frequency as illustrated in part (B) of FIG. 2. Consequently, the light beam undergoes phase modulation of $\pi\pm\phi$ radians due to low frequency component, in addition to the 0-$\pi$ modulation under application of high-frequency driving signals, where $\phi$ represents a variation in degree of phase modulation due to additional low frequency modulation.

When the degree of phase modulation by the high-frequency driving signal agrees with $\pi$ radians, as illustrated in part (C) of FIG. 2, a low frequency component detected from the monitor signal becomes the minimum (or zero). The operating point in this situation is the optimum point. At the optimum operating point, a frequency twice the superimposed low frequency due to fold-back is detected, and the superimposed low frequency component is not detected.

When the voltage-to-phase characteristic of the optical modulator 12 changes with time or in response to wavelength, modulation deviates from the optimum operating point and excessive phase modulation over $\pi$ radians or insufficient phase modulation less than $\pi$ radians occurs. In this case, a low frequency component is detected from the output of the optical modulator 12. The phase of the detected low frequency component becomes reverse between excessive modulation over $\pi$ radians and insufficient modulation below $\pi$ radians. By changing the substrate bias voltage of the optical modulator 12, the voltage-to-phase characteristic of the optical modulator 12 can be changed. Accordingly, the phase modulation between 0 radians and $\pi$ radians can be maintained by controlling the substrate bias voltage such that the low frequency component contained in the output of the optical modulator 12 becomes the minimum.

In part (D) of FIG. 2, a substrate bias voltage less than the optimum level is applied, and a low frequency component in-phase with the superimposed low frequency signal is detected. The substrate bias control circuit 17 increases the substrate bias voltage. In part (E) of FIG. 2, a substrate bias voltage greater than the optimum level is applied, and a low frequency component 180-degrees out-of-phase from the superimposed low frequency signal is detected. Then, the substrate bias control circuit 17 decreases the substrate bias voltage.

This control scheme does not involve driving circuits in adjustment of the voltage-to-phase characteristic of the optical modulator, and it achieves stable 0-π phase modulation regardless of change of the wavelength of the inputted light beam or change with time in the voltage-to-phase characteristic of the optical modulator 12.

It should be noted that the amplitudes of the driving signal output from the driving circuits 13a and 13b may be monitored to perform feedback control to maintain the driving amplitude to a fixed level. Alternatively, feed-forward control may be performed on the driving amplitude with respect to a temperature change or a power source fluctuation.

Second Embodiment

Figure 3:
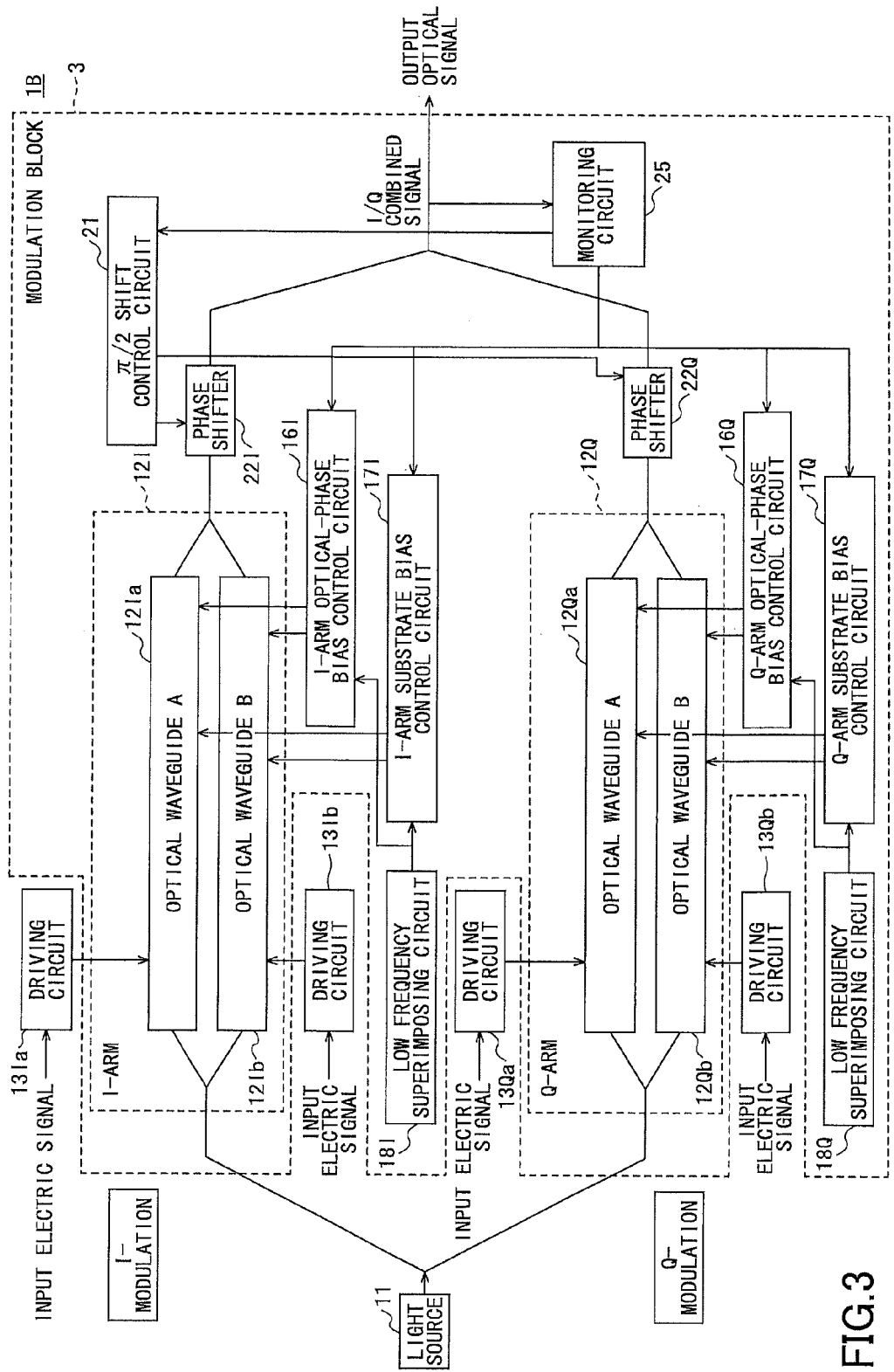
FIG. 3 is a schematic diagram of an optical transmitter according to the second embodiment.

FIG. 3 is a schematic diagram of an optical transmitter 1B, which is an example of the optical communication device according to the second embodiment. The optical transmitter 1B is applied to QPSK, and it has an in-phase modulation arm (I-arm) and a quadrature modulation arm (Q-arm).

The light emitted from the light source 11 is split into two paths and guided to the Mach-Zehnder optical modulator 12I (which may be referred to simply as "I-arm modulator 12I") and the Mach-Zehnder optical modulator 12Q (which may be referred to simply as (Q-arm modulator 12Q) of a modulation block 3. Each of the I-arm modulator 12I and the Q-arm modulator 12Q has a pair of waveguides, and the amount of phase change of light with respect to a voltage varies according to a substrate bias voltage as in the first embodiment. In the I-arm modulator 12I and the Q-arm modulator 12Q, the input light is split into two paths and guided to waveguide A and waveguide B. The output light beam from the I-arm modulator 12I and the output light beam from the Q-arm modulator 12 undergo phase adjustment at a phase shifter 22I and a phase shifter 22Q, respectively, so as to produce a phase difference of π/2 radians (i.e., 90 degrees) between the light beams from the I-arm modulator 12I and the Q-arm modulator 12Q. The light beams with π/2 phase difference are combined and output from the modulation block 3.

A portion of the combined light containing the in-phase (I) component and the quadrature-phase (Q) component is monitored at a monitoring circuit 25. The monitoring result is supplied to a π/2 shift control circuit 21, optical-phase bias control circuits 16I and 16Q, and substrate bias control circuits 17I and 17Q.

In the I-arm modulator 12I, high-frequency drive signals output from driving circuits 13Ia and 13Ib are applied to the waveguides 12Ia and 12Ib, respectively, to modulate the light beams at a high speed. The waveguides 12Ia and 12Ib are driven by drive signals with opposite signs. The light beams traveling through the waveguides 12Ia and 12Ib are combined, and output from the I-arm optical modulator 12I. The combined output light has undergone binary phase modulation between 0 radians and π radians. Similarly, in the Q-arm modulator 12QI, high-frequency drive signals output from driving circuits 13Qa and 13Qb are applied to the waveguides 12Qa and 12Qb, respectively, to modulate the light beams at a high speed. The waveguides 12Ia and 12Ib are driven by drive signals with opposite signs. The light beams traveling through the waveguides 12Qa and 12Qb are combined, and output from the Q-arm optical modulator 12Q. The combined output light has undergone binary phase modulation between 0 radians and π radians. If the driving circuits 13 define multi-level amplitudes, the amplitude (or the intensity) of the output light is modulated in multiple levels; however, the phase modulation is binary.

Both the I-modulator 12I and the Q-modulator 12Q are semiconductor optical modulators, such as indium phosphide (InP) modulators. Upon application of a voltage, the absorption edge wavelength of the semiconductor material changes, and the light phase is modulated making use of a phase shift due to the absorption according to Kramers-Kronig relations. A π/2 phase difference is added between the light output from the I-arm modulator 12I and the light output from the Q-arm modulator 12Q, and the I-Q combined light is a light beam having undergone quadrature phase shift keying.

As in the first embodiment, a low frequency signal is supplied from a low frequency superimposing circuit 18I to an I-arm substrate bias control circuit 17I and an I-arm optical-phase bias control circuit 16I. The I-arm substrate bias control circuit 17I slightly modulates a substrate bias voltage with the low frequency signal. Similarly, a low frequency signal is supplied from a low frequency superimposing circuit 18Q to a Q-arm substrate bias control circuit 17Q and a Q-arm optical-phase bias control circuit 16Q. The Q-arm substrate bias control circuit 17Q slightly modulates a substrate bias voltage with the low frequency signal.

A portion of the combined light containing I-phase modulated light and Q-phase modulation light is input as a monitor light to the monitoring circuit 25. The monitor light is converted into an electric monitor signal and supplied from the monitoring circuit 25 to the I-arm substrate bias control circuit 17I, Q-arm substrate bias control circuit 17Q, I-arm optical-phase control circuit 16I and the Q-arm optical-phase control circuit 16Q. Each of the I-arm substrate bias control circuit 17I and the Q-arm substrate bias control circuit 17Q carries out synchronous detection on the low frequency component contained in the monitor signal. At the optimum operating point, the detected low frequency component becomes zero. If modulation deviates from the optimum operating point, the polarity (or phase) of the detected low frequency component is reversed depending on the direction of deviation. Accordingly, by detecting the low frequency component, the direction and quantity of control on the substrate bias voltage can be known, as has been explained with reference to FIG. 2.

Each of the optical-phase bias control circuits 16I and 16Q controls a phase bias voltage based upon the detection of the low frequency component. The phase bias voltage is slightly modulated by the low frequency signal, and the phase bias voltage is controlled to bring the low frequency component contained in the monitor signal closer to zero. Under this phase bias control, the phase difference between the light beams on the two waveguides A and B of a Mach-Zehnder interferometer is adjusted.

Although some connection lines are omitted in FIG. 3 for the purpose of simplification, the low frequency signal may be supplied from the low frequency superimposing circuit 18I or 18Q to a π/2 shift control circuit 21. The π/2 shift control circuit 21 may slightly modulate a π/2 phase shift bias voltage with the low frequency signal, and control the π/2 phase shift bias voltage for the phase shifters 22I and 22Q such that the low frequency component contained in the alternating current component of the monitor signal approaches zero. The substrate bias, the optical-phase bias, and the π/2 shift bias may be controlled independently and in parallel using separate circuits, or alternatively, time sharing control may be performed using a CPU.

Third Embodiment

Figure 4:
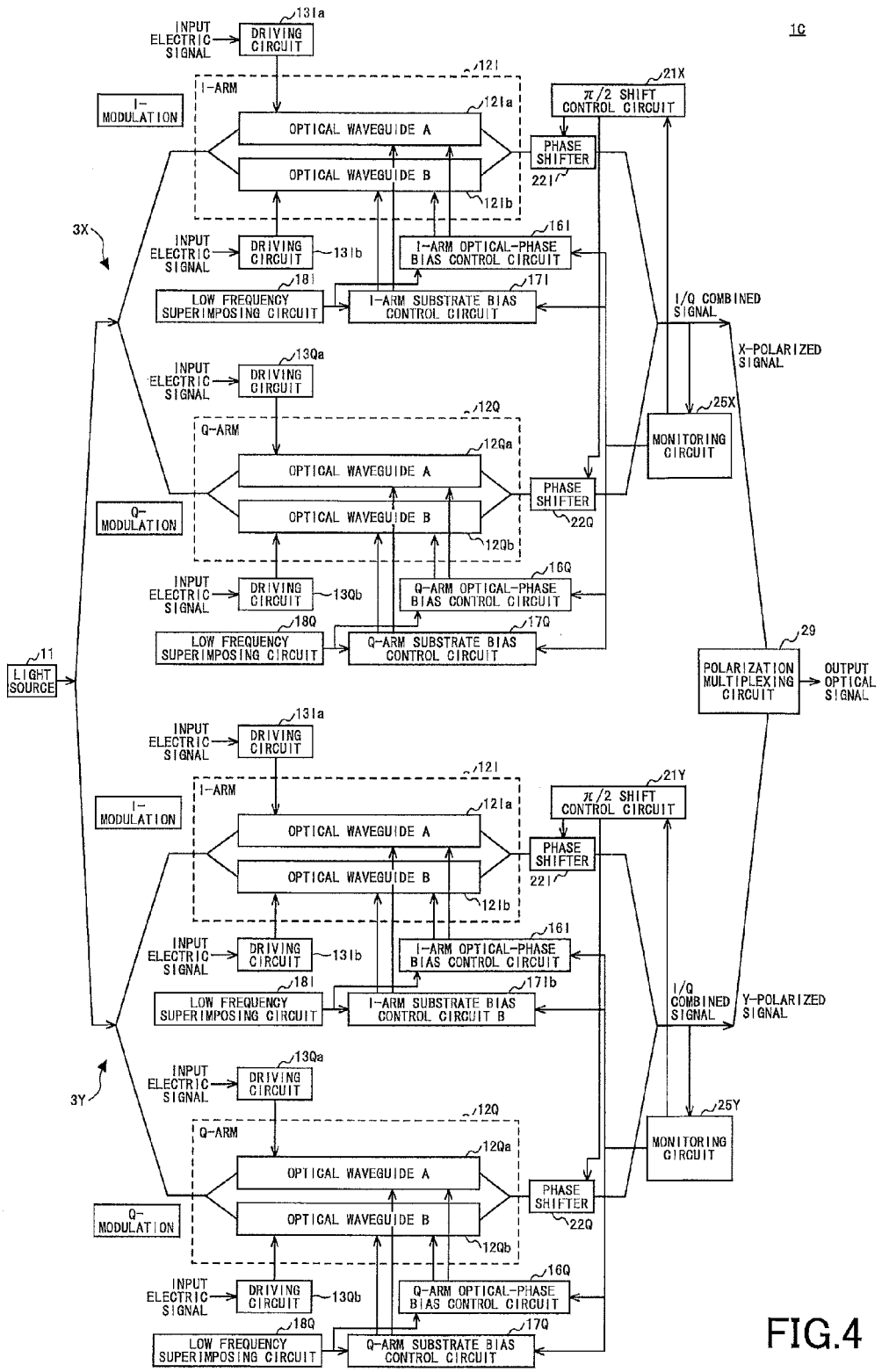
FIG. 4 is a schematic diagram of an optical transmitter according to the third embodiment.

FIG. 4 is a schematic diagram of an optical transmitter 1C, which is an example of an optical communication device, according to the third embodiment. The optical transmitter 1C is applicable to DP-QPSK.

The light emitted from the light source 11 is split into two paths and guided to an X-polarization modulation block 3X and Y-polarization modulation block 3Y. In each of the modulation blocks 3X and 3Y, the light beam is further split into two paths and input to a Mach-Zehnder optical modulator 12I (which may be referred to simply as "I-arm modulator 12I" and a Mach-Zehnder optical modulator 12Q (which may be referred to simply as "Q-arm modulator 12Q"). The configurations of the X-polarization modulation block 3X and the Y-polarization modulation block 3Y are the same as that of the modulation block 3 for QPSK illustrated in FIG. 3, and the redundant explanation is omitted. A monitoring circuit 25X is provided for the X-polarization modulation block 3X and a monitoring circuit 25Y is provided for the Y-polarization modulation block 3Y. The substrate bias voltage, the optical-phase bias voltage, and the π/2 shift bias voltage are feedback controlled using a low frequency signal at each of the modulation blocks 3X and 3Y. The bias control on the substrate bias voltage, the optical-phase bias voltage and the π/2 shift bias voltage are similar to those explained in the second embodiment.

An X-polarized modulated signal and a Y-polarized modulated signal are combined at a polarization multiplexing circuit 29 and output as an optical transmission signal. Instead of providing separate monitoring circuits 25X and 25Y for the respective polarization modulation blocks 3X and 3Y, a single monitoring circuit may be used to monitor a portion of the light beam after polarization multiplexing.

Fourth Embodiment

Figure 5:
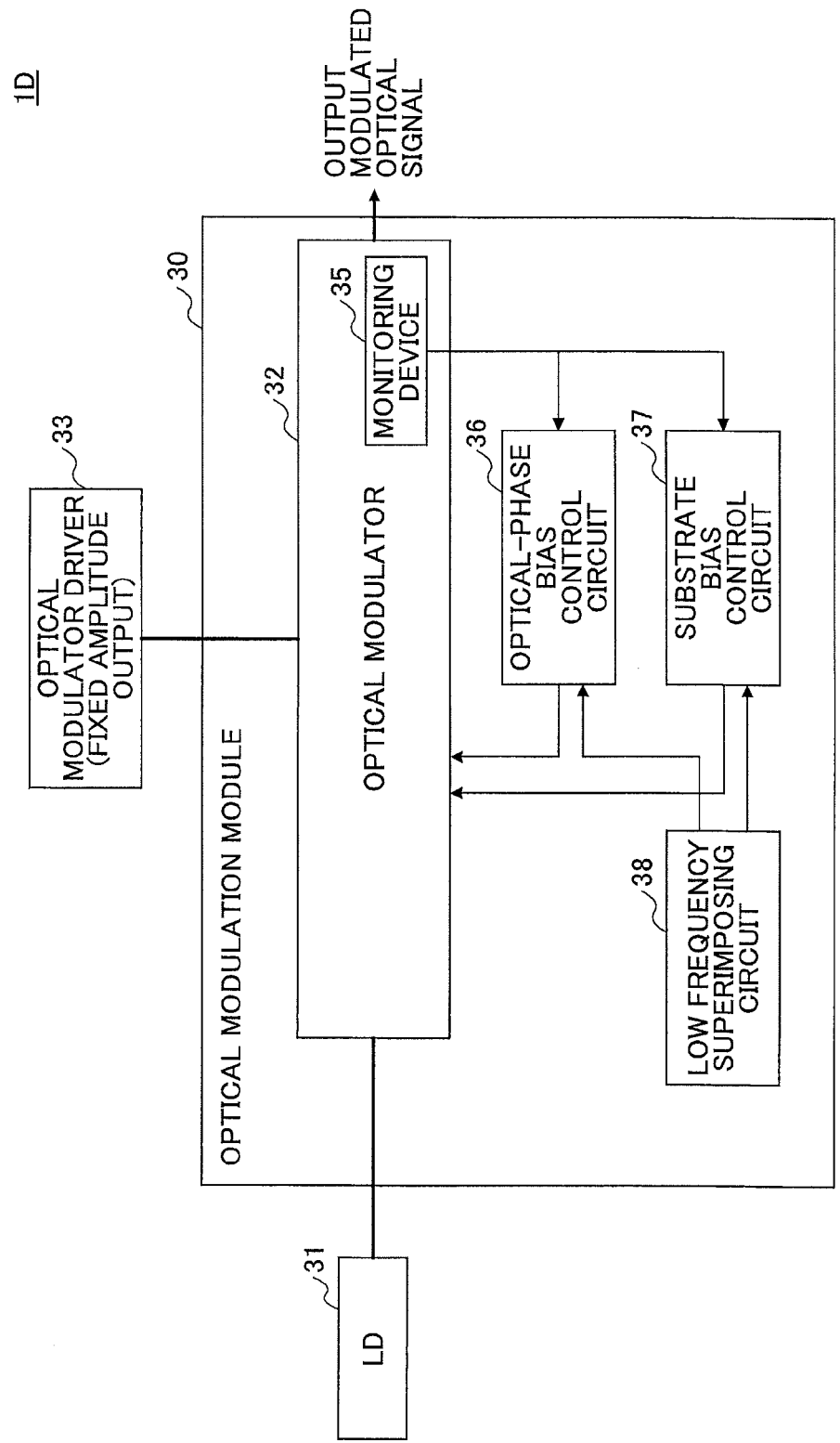
FIG. 5 is a schematic diagram of an optical transmitter according to the fourth embodiment.

FIG. 5 is a schematic diagram of an optical transmitter 1D, which is an example of an optical communication device, according to the fourth embodiment. The optical transmitter 1D has a laser diode (LD) 31 used as a light source, an optical modulation module 30, and an optical modulator driver 33.

In the optical transmitter 1D, a semiconductor optical modulator 32 with a monitoring device 35, an optical-phase bias control circuit 36, a substrate bias control circuit 37, and a low frequency superimposing circuit 38 are accommodated in an optical modulation module 30. The monitoring device 35 has, for example, a photo detector, and converts the detected light signal to an electric signal, which electric signal is supplied to the optical-phase bias control circuit 36 and the substrate bias control circuit 37.

Although in this example the optical modulation module 30 is designed based upon the structure of FIG. 1, the QPSK optical modulation block 3 of FIG. 3 may be provided in the optical modulation module 30. In this case, the optical modulator driver 33 including the driving circuits 13Ia, 13Ib, 13Qa, and 13Qb of FIG. 3 may be provided outside the optical modulation module 30. Alternatively, the DP-QPSK optical modulation blocks 3X and 3Y and the polarization multiplexing circuit 49 of FIG. 4 may be accommodated in the optical modulation module 30. In either case, the optical modulator driver 33 (including the driving circuits 13Ia, 13Ib, 13Qa, and 13Qb) is provided outside the optical modulation module 30. Because a low frequency signal is superimposed on the substrate bias voltage, in place of superimposing the low frequency signal on the modulator driving signal, for the feedback control, the bias control system can be made compact.

The bias control system (including the optical-phase bias control circuit 36, the substrate bias control circuit 37, and the low frequency superimposing circuit 38) and the optical modulator 32 can be mounted in the same module (or component). Consequently, handling of the optical transmitter 1D is facilitated.

Fifth Embodiment

Figure 6:
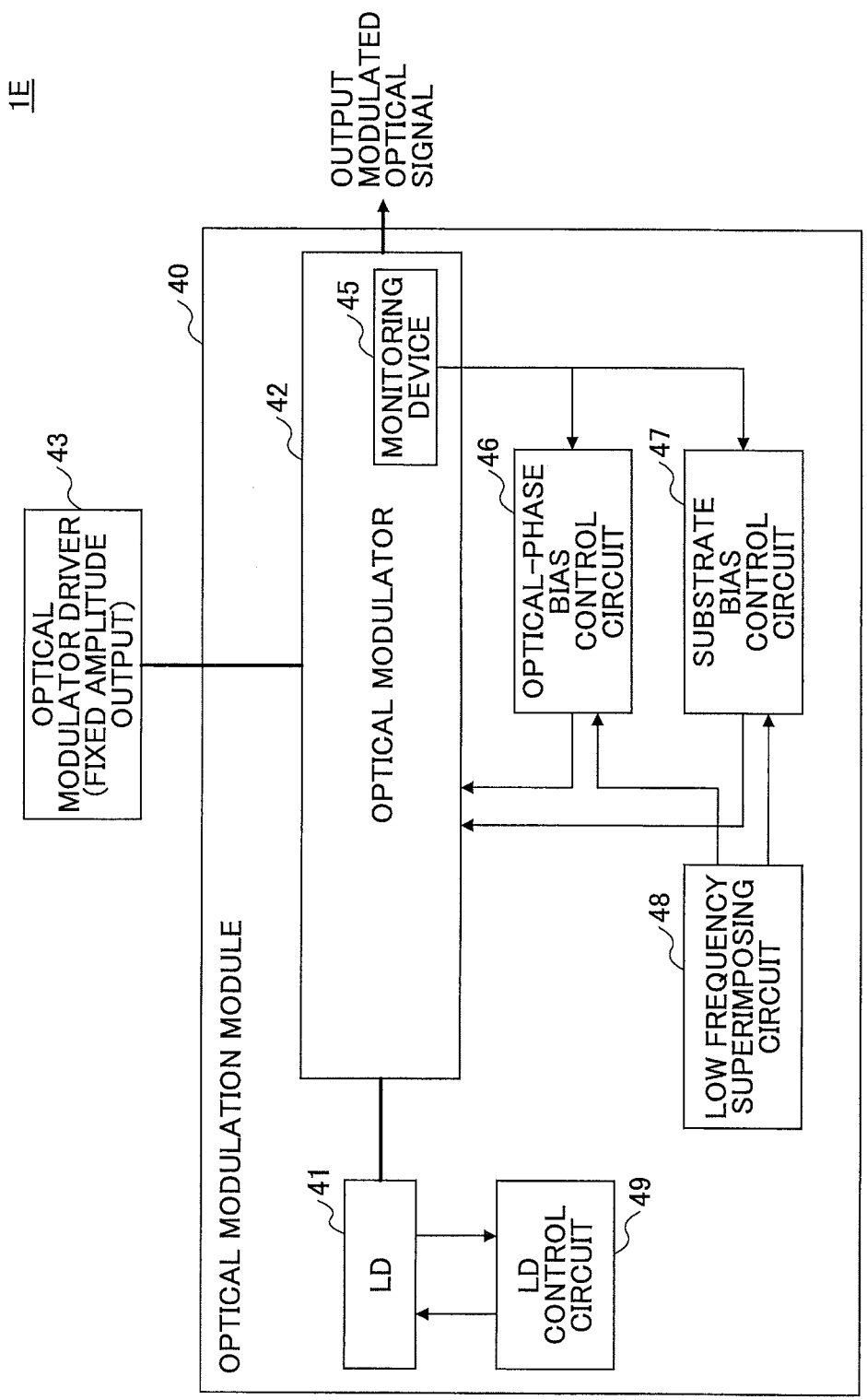
FIG. 6 is a schematic diagram of an optical transmitter according to the fifth embodiment.

FIG. 6 is a schematic diagram of an optical transmitter 1E, which is an example of an optical communication device, according to the fifth embodiment. The optical transmitter 1E has an optical modulation module 40 and an optical modulator driver 43.

In the optical transmitter 1E, a semiconductor optical modulator 42 with a monitoring device 45, an optical-phase bias control circuit 46, a substrate bias control circuit 47, a low frequency superimposing circuit 48, a light source (LD) 41, and a light source (LD) control circuit 49 are accommodated in an optical modulation module 40. This configuration implements the optical modulation module 60 with a built-in light source unit including the light source 41 and the light source control circuit 49.

Although in this example the optical modulation module 40 is designed based upon the structure of FIG. 1, the QPSK optical modulation block 3 of FIG. 3 may be provided in the optical modulation module 40. In this case, the driving circuits 13Ia, 13Ib, 13Qa, and 13Qb may be provided outside the optical modulation module 40. Alternatively, the DP-QPSK optical modulation blocks 3X and 3Y and the polarization multiplexing circuit 29 of FIG. 4 may be accommodated in the optical modulation module 40.

Sixth Embodiment

Figure 7:
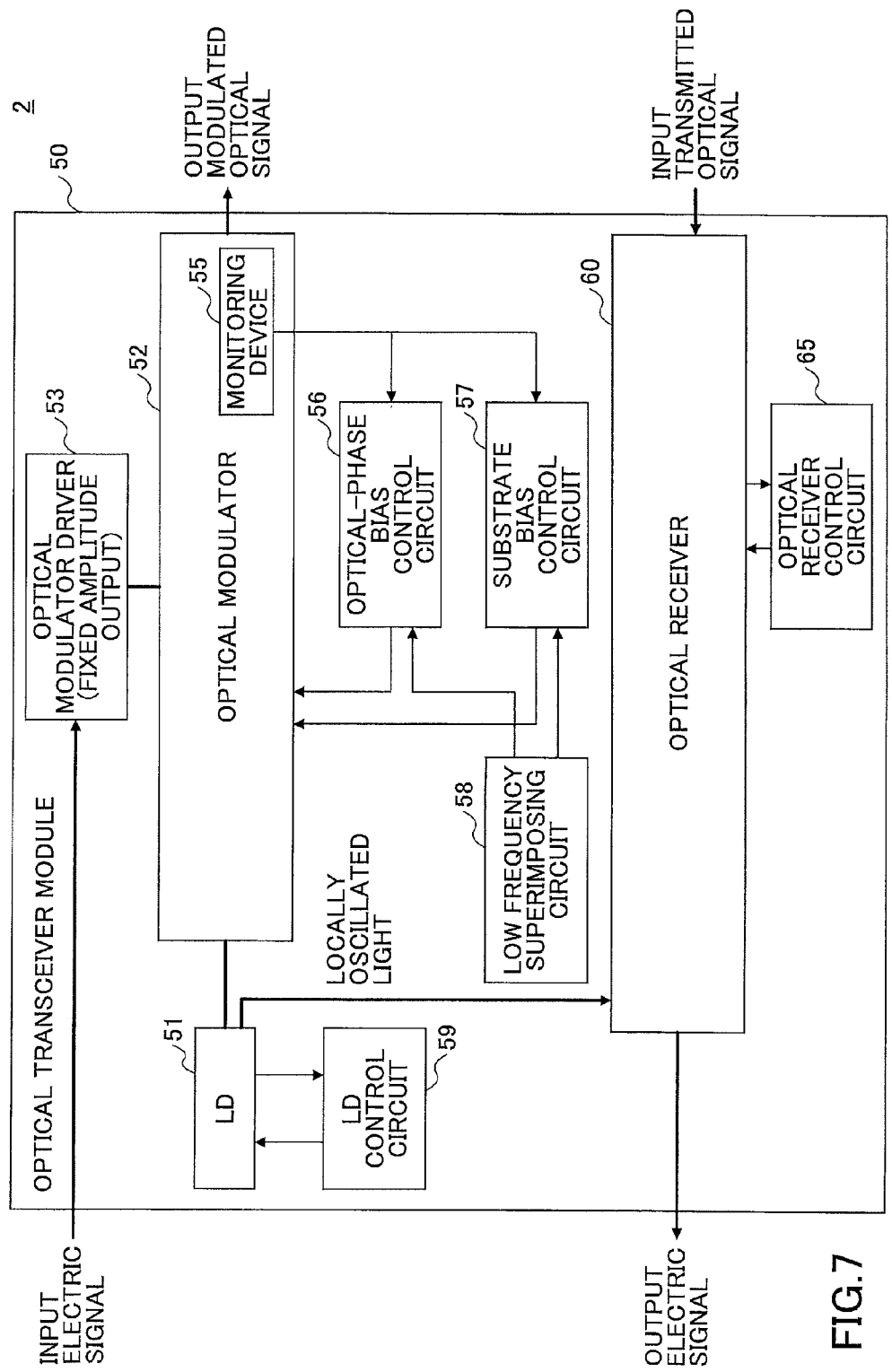
FIG. 7 is a schematic diagram of an optical transceiver according to the sixth embodiment.

FIG. 7 is a schematic diagram of an optical transceiver 2, which is an example of an optical communication device, according to the sixth embodiment. In the optical transceiver 2, a transmission system and a receiving system are accommodated in an optical transceiver module 50. The transmission system includes a semiconductor optical modulator 52 with a monitoring device 55, a light source unit, a bias control unit, and an optical modulator driver 53. The light source unit includes a light source (LD) 51 and a light source (LD) control circuit 59. The bias control unit includes an optical-phase bias control circuit 56, a substrate bias control circuit 57, and a low frequency superimposing circuit 58.

The receiving system includes an optical receiver 60 and an optical receiver control circuit 65. A portion of the light beam output from the LD 51 is branched and input as a local oscillation light to the optical receiver 60. The optical receiver 60 mixes the received light signal with the local oscillation light to perform coherent light detection. The detected light is subjected to optical-to-electric conversion and current-to-voltage conversion, and an electric signal is output from the optical receiver 60. This configuration implements a compact optical transceiver frontend module.

Although in this example the transmission system of the optical transceiver module 50 is designed based upon the structure of FIG. 1 (the first embodiment), the QPSK optical transmitter of FIG. 3 may be used in the optical transceiver module 50. The DP-QPSK optical transmitter of FIG. 4 may also be accommodated in the optical modulation module 50.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical communication device comprising:
   an optical modulator of a Mach-Zehnder type;
   a low frequency superimposing circuit configured to superimpose a low frequency signal on a substrate bias voltage applied to the optical modulator;
   a monitor configured to monitor a modulated light output from the optical modulator; and
   a substrate bias controller configured to control the substrate bias voltage based upon a low frequency component contained in a monitor signal output from the monitor,
   wherein an amount of phase change of light travelling through the optical modulator varies depending on the substrate bias voltage.

2. The optical communication device according to claim 1, further comprising:
   a phase bias controller configured to control a phase bias voltage applied to the optical modulator based upon the low frequency component contained in the monitor signal output from the monitor,
   wherein the low frequency superimposing circuit is configured to superimpose the low frequency signal on the phase bias voltage.

3. The optical communication device according to claim 2, further comprising:
   a driving circuit configured to apply a drive signal for modulation to the optical modulator,
   wherein the optical modulator, the monitor, the substrate bias controller, and the phase bias controller are arranged in a single component, and the driving circuit is arranged outside the single component.

4. The optical communication device according to claim 3, further comprising:
   a light source configured to emit a light beam; and
   a light-source controller configured to control the light source;
   wherein the light source and the light-source controller are arranged in the single component.

5. The optical communication device according to claim 1, further comprising:
   a driving circuit configured to apply a drive signal for modulation to the optical modulator,
   wherein the optical modulator, the monitor, and the substrate bias controller are arranged in a single component, and the driving circuit is arranged outside the single component.

6. The optical communication device according to claim 5, further comprising:
   a light source configured to emit a light beam; and
   a light-source controller configured to control the light source;
   wherein the light source and the light-source controller are arranged in the single component.

7. A method of controlling an optical modulator, comprising:
   superimposing a low frequency signal on a substrate bias voltage applied to an optical modulator of a Mach-Zehnder type;
   monitoring a portion of an output from the optical modulator and detecting a low frequency component contained in the output; and
   controlling the substrate bias voltage based upon the low frequency component,
   wherein an amount of phase change of light travelling through the optical modulator varies depending on the substrate bias voltage.

* * * * *